US008781740B2

(12) United States Patent
Ichikawa

(10) Patent No.: US 8,781,740 B2

(45) Date of Patent: Jul. 15, 2014

(54) DRIVING OPERATION DIAGNOSTIC APPARATUS AND METHOD FOR DIAGNOSING DRIVING OPERATION

(75) Inventor: Daiki Ichikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 615 days.

(21) Appl. No.: 12/801,137

(22) Filed: May 25, 2010

(65) Prior Publication Data

US 2010/0305814 A1 Dec. 2, 2010

(30) Foreign Application Priority Data

May 29, 2009 (JP) ................................ 2009-130300
Apr. 22, 2010 (JP) ................................ 2010-99102

(51) Int. Cl.
*G01S 1/00* (2006.01)
*G01S 5/02* (2010.01)
*G01C 21/00* (2006.01)

(52) U.S. Cl.
USPC ......... 701/527; 701/123; 701/32.1; 701/32.4; 701/538; 701/201; 377/24.1

(58) Field of Classification Search
CPC ........ G07C 5/02; G07C 5/0808; G07B 13/00; G01C 22/00
USPC ................ 701/123, 527, 538, 32.1, 32.4, 201
See application file for complete search history.

(56) References Cited

U.S. PATENT DOCUMENTS

| | | | | |
|---|---|---|---|---|
| 5,902,348 | A * | 5/1999 | Okamoto et al. | 701/535 |
| 6,438,472 | B1 * | 8/2002 | Tano et al. | 701/29.6 |
| 8,280,619 | B2 * | 10/2012 | Watkins | 701/123 |
| 2004/0008109 | A1 * | 1/2004 | Endoh | 340/450.2 |
| 2004/0249527 | A1 | 12/2004 | Tomita et al. | |
| 2005/0096836 | A1 | 5/2005 | Minami et al. | |
| 2005/0137757 | A1 * | 6/2005 | Phelan et al. | 701/1 |
| 2005/0143876 | A1 | 6/2005 | Tanase | |
| 2006/0085102 | A1 * | 4/2006 | Doel et al. | 701/14 |
| 2006/0287815 | A1 * | 12/2006 | Gluck | 701/208 |
| 2009/0281715 | A1 * | 11/2009 | Paik | 701/123 |
| 2010/0102945 | A1 * | 4/2010 | Watson et al. | 340/462 |

FOREIGN PATENT DOCUMENTS

| | | |
|---|---|---|
| EP | 1403126 A2 * | 3/2004 |
| JP | B2-2715424 | 11/1997 |
| JP | A-2000-067390 | 3/2000 |

(Continued)

OTHER PUBLICATIONS

Office Action mailed on Apr. 12, 2011 issued in the corresponding Japanese Patent Application No. 2010-099102 (English translation enclosed).

*Primary Examiner* — Fadey Jabr
*Assistant Examiner* — Thomas Ingram
(74) *Attorney, Agent, or Firm* — Posz Law Group, PLC

(57) ABSTRACT

A storing unit stores traveling history information items on a vehicle, the traveling history information items being respectively associated with trips each being a segment from a start of a driving operation to an end of the driving operation. A determination unit determines whether to assign one of the traveling history information items, which is stored in the storing unit and associated with one trip, to a predetermined period, the one trip being partially included in the predetermined period. A driving operation diagnostic unit diagnoses a driving operation of a driver in the predetermined period according to the traveling history information item determined by the determination unit to be assigned to the predetermined period.

26 Claims, 7 Drawing Sheets

(56) References Cited

FOREIGN PATENT DOCUMENTS

| | | |
|---|---|---|
| JP | A-2001-108503 | 4/2001 |
| JP | B2-3331112 | 7/2002 |
| JP | A-2002-600640 | 10/2002 |
| JP | A-2003-233655 | 8/2003 |
| JP | A-2004-189144 | 7/2004 |
| JP | A-2006-243856 | 9/2006 |
| JP | B2-3893879 | 12/2006 |
| JP | A-2007-284049 | 11/2007 |

* cited by examiner

FIG. 2
| | TRIP 1 | TRIP 2 | TRIP 3 |
|---|---|---|---|
| START DATE AND TIME | 09/3/3 8:10 | 09/3/3 10:05 | 09/3/3 23:10 |
| END DATE AND TIME | 09/3/3 9:30 | 09/3/3 11:05 | 09/3/4 0:40 |
| TRAVEL PERIOD [min] | 80 | 60 | 90 |
| TRAVEL DISTANCE [km] | 16.3 | 17.4 | 32.2 |
| FUEL CONSUMPTION [l] | 2.4 | 2.5 | 3.7 |
| FUEL EFFICIENCY [km/l] | 6.79 | 6.96 | 8.71 |
| SUDDEN ACCELERATION [times] | 2 | 1 | 0 |
| SUDDEN BRAKING [times] | 0 | 1 | 0 |
| SUDDEN STEERING [times] | 1 | 2 | 1 |
FIG. 3A
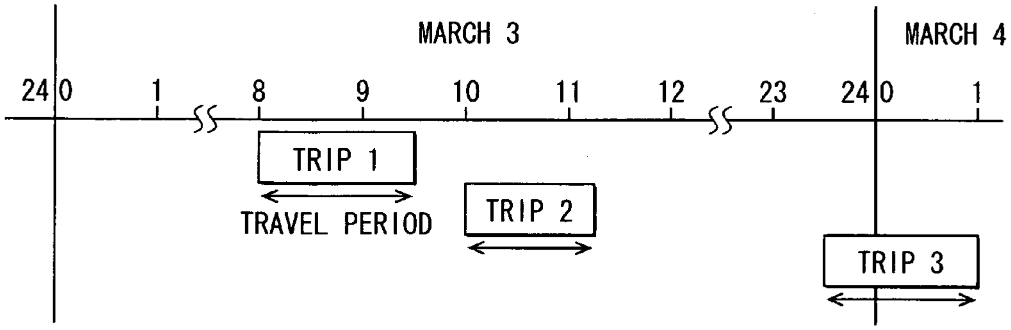
FIG. 3B
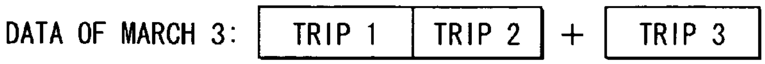

FIG. 4

| | MARCH 3 |
|---|---|
| TRAVEL PERIOD [min] | 140 |
| TRAVEL DISTANCE [km] | 33.7 |
| FUEL CONSUMPTION [l] | 4.9 |
| FUEL EFFICIENCY [km/l] | 6.88 |
| SUDDEN ACCELERATION [times] | 3 |
| SUDDEN BRAKING [times] | 1 |
| SUDDEN STEERING [times] | 3 |

AFTER TRIP 3

| | MARCH 3 |
|---|---|
| TRAVEL PERIOD [min] | 230 |
| TRAVEL DISTANCE [km] | 65.9 |
| FUEL CONSUMPTION [l] | 8.6 |
| FUEL EFFICIENCY [km/l] | 7.66 |
| SUDDEN ACCELERATION [times] | 3 |
| SUDDEN BRAKING [times] | 1 |
| SUDDEN STEERING [times] | 4 |

DRIVING OPERATION DIAGNOSTIC APPARATUS AND METHOD FOR DIAGNOSING DRIVING OPERATION

CROSS REFERENCE TO RELATED APPLICATIONS

This application is based on and incorporates herein by reference Japanese Patent Applications No. 2009-130300 filed on May 29, 2009 and No. 2010-99102 filed on Apr. 22, 2010.

FIELD OF THE INVENTION

The present invention relates to a driving operation diagnostic apparatus configured to obtain information from various sensors of a vehicle to diagnose a driving operation of a driver based on the obtained information. The present invention relates to a method for diagnosing a driving operation.

BACKGROUND OF THE INVENTION

For example, a driver can operate a vehicle while being conscious of fuel consumption when the driver is provided with fuel consumption information specifying a distance by which the vehicle can travel with one litter of fuel. Fuel consumption has a correlation with a driving operation of a driver and a vehicle status. Such a driving operation has a correlation with a condition of the driver such as a physical condition, feeling, a hurrying condition, and the like in a driving operation. Such a vehicle status has a correlation with an engine condition, air pressure of a tire, and the like. A fuel-efficient driving operation has a merit for the environment of the earth in addition to reduction in a fuel cost.

In recent years, a known function to indicate a fuel consumption of a vehicle operated by a driver in the vehicle is in practice. Such an indication of a fuel consumption may be carried out by indicating a momentary fuel consumption in a traveling of a vehicle or by indicating an average fuel consumption, which is an average value of a fuel consumption in a certain traveling segment. For example, Japanese Patent 3893879 discloses an art to indicate information on an average fuel consumption, for each trip. The trip is a continuous driving operation unit from a start of a driving operation to an end of the driving operation.

A driving operation of a driver and a vehicle status regularly changes. Such a driving operation is also dependent on a physical condition of a driver in the day, the climate such as the temperature and the weather, and the like. For example, such a driving operation changes on a basis of a various time unit such as one day, one month, one year, and one trip. Japanese Patent 3893879 discloses an art to indicate fuel consumption information on a vehicle driven by a driver for each trip. It is noted that, a user may request to indicate fuel consumption information on a daily basis, for example. In such a case, when a travel period of a trip from its start to its end is completely included within one day, information of such a trip may be provided without a problem. However, when a trip continues for two days, treatment of such a trip is problematic. For example, it is supposed a case where a driving operation continues beyond 0:00 on March 4. In such a case, in consideration of such a trip being a time unit of a continuous travel period from a start of a driving operation until an end of the driving operation, division of the trip into a trip portion of March 3 and a trip portion of March 4 is not desirable.

SUMMARY OF THE INVENTION

In view of the foregoing and other problems, it is an object of the present invention to produce a driving operation diagnostic apparatus configured to diagnose a driving operation of a driver in a predetermined period without dividing a trip being a continuous driving operation period. It is another object of the present invention to produce a method for diagnosing a driving operation.

According to one aspect of the present invention, a driving operation diagnostic apparatus comprises a storing unit configured to store traveling history information items on a vehicle, the traveling history information items being respectively associated with trips each being a segment from a start of a driving operation to an end of the driving operation. The driving operation diagnostic apparatus further comprises a determination unit configured to determine whether to assign one of the traveling history information items, which is stored in the storing unit and associated with one trip, to a predetermined period, the one trip being partially included in the predetermined period. The driving operation diagnostic apparatus further comprises a driving operation diagnostic unit configured to diagnose a driving operation of a driver in the predetermined period according to the one traveling history information item determined by the determination unit to be assigned to the predetermined period.

According to another aspect of the present invention, a method for diagnosing a driving operation, the method comprises storing traveling history information items on a vehicle, the traveling history information items being respectively associated with trips each being a segment from a start of a driving operation to an end of the driving operation. The method further comprises determining whether to assign one of the stored traveling history information items, which is associated with one trip, to a predetermined period, the one trip being partially included in the predetermined period. The method further comprises diagnosing a driving operation of a driver in the predetermined period according to the one traveling history information item determined to be assigned to the predetermined period.

BRIEF DESCRIPTION OF THE DRAWINGS

The above and other objects, features and advantages of the present invention will become more apparent from the following detailed description made with reference to the accompanying drawings. In the drawings:

FIG. 2 is an explanatory view showing an example of trip data according to the embodiment;

FIGS. 3A, 3B are explanatory views each showing trips in two days including March 3 and March 4 according to the embodiment;

FIG. 4 is an explanatory view showing data of March 3 in the upper view and updated data of March 3 in the lower view, according to the embodiment;

DETAILED DESCRIPTION OF PREFERRED EMBODIMENTS

As follows, embodiments will be described with reference to drawings. In the present embodiment, a driving operation diagnostic apparatus is applied to a driving operation diagnostic system for a vehicle. In the present embodiment, a predetermined period is set to one day, and a driving operation of a driver is diagnosed. Therefore, a user can demand a diagnostic result in a time unit of one day.

Embodiment

Figure 1:
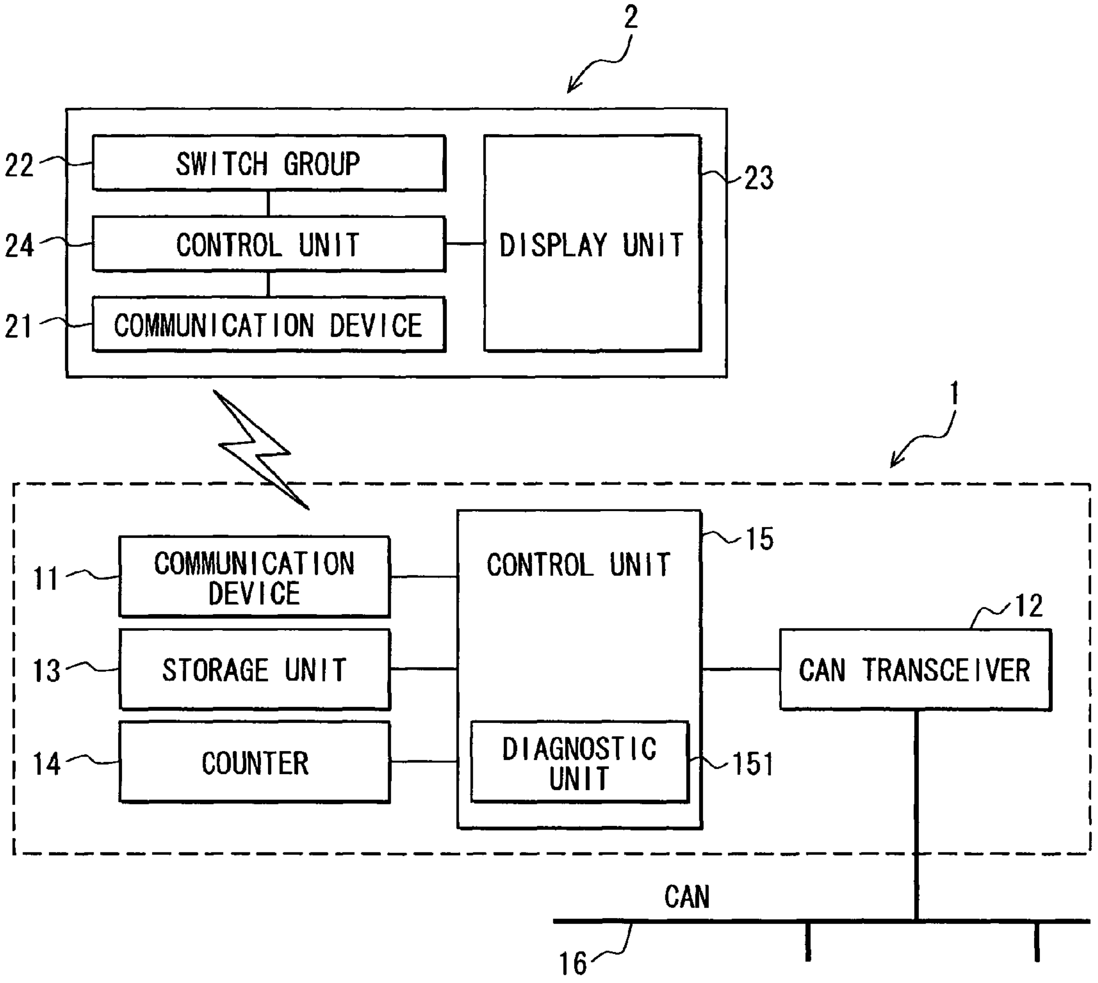
FIG. 1 is a block diagram showing a driving operation diagnostic system according to an embodiment.

FIG. 1 is a block diagram showing a structure of a driving operation diagnostic system according to the present embodiment. In the present embodiment, the driving operation diagnostic system includes a driving operation diagnostic apparatus 1 and a cellular phone 2. As follows, a configuration of the cellular phone 2 will be described. The cellular phone 2 includes a communication device 21, an operation switch group 22, a display unit 23, and a control unit 24.

The communication device 21 is a communication equipment including a transmitting device and a receiving device to exchange information with the driving operation diagnostic apparatus 1. The communication device 21 transmits information such as information for requesting start and end of a communication, diagnosis request information for requesting diagnosis of a driving operation of a driver to the driving operation diagnostic apparatus 1, date and time information stored in the cellular phone 2, and the like. The communication device. 21 receives information such as driving operation diagnostic result information on a driver, and the like. The communications are performed by utilizing a near-field wireless communication. In the present embodiment, the communications are performed by utilizing the Bluetooth protocol (registered trademark).

The operation switch group 22 includes, for example, push buttons provided around the display unit 23. A user inputs, for example, a request for a diagnostic result of a driving operation in a desired period by manipulating the operation switch group 22. The diagnostic period desired by a user may be set to one day as a minimum unit and may be set to one week, one month, or one year, for example.

The display unit 23 includes, for example, a liquid crystal display (LCD) configured to indicate an object in color. The display unit 23 is configured to indicate various information such as information inputted by a user via the user in the operation switch group 22 and information received from the driving operation diagnostic apparatus 1 via the communication device 21.

The control unit 24 mainly includes, for example, a generally-known microcomputer including a CPU, a ROM, a RAM, an I/O device, and a bus line, which connects thereamong. The control unit 24 performs, in line with a program stored in the ROM and/or the like, an information indication operation, a communication operation, and the like. The information indication operation is for causing the display unit 23 to indicate information inputted by a user or information received via the communication device 21, an the like. The communication operation is for causing the communication device 21 to exchange data with the driving operation diagnostic apparatus 1.

Next, a configuration of the driving operation diagnostic apparatus 1 will be described. The driving operation diagnostic apparatus 1 includes a communication device 11, a CAN transceiver 12, a storage unit 13, a counter 14, and a control unit 15. The CAN transceiver 12 is provided with information obtained via a controller area network (CAN) 16.

The communication device 11 is a communication equipment including a transmitting device and a receiving device to exchange information with the cellular phone 2. The communications are performed by utilizing a near-field wireless communication. In the present embodiment, the communications are performed by utilizing Bluetooth (registered trademark).

The CAN transceiver 12 obtains various information via the CAN 16, which functions as a communication network line in the vehicle. The CAN 16 therethrough communicates information of an engine rotation speed sensor, a fuel consumption sensor, a speed sensor, an acceleration sensor, an angular velocity sensor, a driving distance sensor, an ignition switch, and the like. The engine rotation speed sensor detects an engine rotation speed, which is used to control an operation of the vehicle, for example. The fuel consumption sensor detects a fuel consumption. The speed sensor detects a vehicle speed. The acceleration sensor detects an acceleration of the vehicle. The angular velocity sensor detects an angular velocity of the vehicle. The driving distance sensor detects a driving distance according to a wheel rotation speed. The ignition switch is used to activate and deactivate a driving source of the vehicle.

When a trip is completed, the storage unit 13 stores travel history information (trip data) on the vehicle driven by a driver, as data of the day, in which the trip was started. The trip is a travel period, which is a time unit after the ignition switch is activated before the ignition switch is deactivated. As shown in FIG. 2, the trip data includes a date and time of a start of a trip, a date and time of an end of the trip, for example. The trip data further includes a travel period, a travel distance, a fuel consumption, a number of sudden acceleration operations, a number of sudden braking operations, a number of sudden steering operations, and the like in the trip, for example. The travel period may be calculated from a date and time of a start of a trip and a date and time of an end of a trip. A travel distance, a fuel consumption, the number of sudden braking operations, and the like can be calculated from information obtained via the CAN transceiver 12. The number of sudden braking operations may be calculated by counting occasions in each of which a negative acceleration of the vehicle becomes greater than a predetermined threshold. The number of sudden acceleration operations may be calculated by counting occasions in each of which a positive acceleration of the vehicle becomes greater than a predetermined threshold. The number of sudden steering operations may be calculated by counting occasions in each of which an angular velocity of the vehicle becomes greater than a predetermined threshold.

For example, as shown in FIG. 3A, data of another trip (e.g., trips 1, 2) may be already stored in a day in which a trip 3 is started. In such a case, as shown in FIG. 3B, trip data of the present trip 3 is added to the already stored trip data of the other trip (trips 1, 2) and the added data (trips 1, 2, 3) is stored. Specifically, for example, it is assumed that the trip 1 and the trip 2 are already done on March 3. In this case, as shown in the upper view of FIG. 4, the trip data of the trip 2 is added to the trip data of the trip 1, and the added data is already stored as the data on March 3. It is supposed that when the trip 3 is completed, the trip data of the trip 3 is stored as data of the day when the trip 3 is started. In this case, as shown in the lower view of FIG. 4, the trip data of the trip 3 is added to the data on March 3, and the added data is newly stored as the data on March 3.

Referring to FIG. 1, a counter 14 counts an elapsed time from a reference time, which is obtained from the date and time information received from the cellular phone 2 via the communication device 11. The storage unit 13 stores a date and time of a start of a trip and a date and time of an end of the trip calculated from the elapsed time. When date and time information is received from the cellular phone 2 via the communication device 11, the reference time is corrected based on the time.

The control unit 15 mainly includes, for example, a generally-known microcomputer including a CPU, a ROM, a RAM, an I/O device, and a bus line, which connects thereamong. The control unit 15 performs a communication operation and the like according to a program stored in the ROM and/or the like. When performing the communication operation, the control unit 15 causes the communication device 11 to exchange data with the cellular phone 2. The control unit 15 includes an operation diagnostic unit 151.

Figure 5:
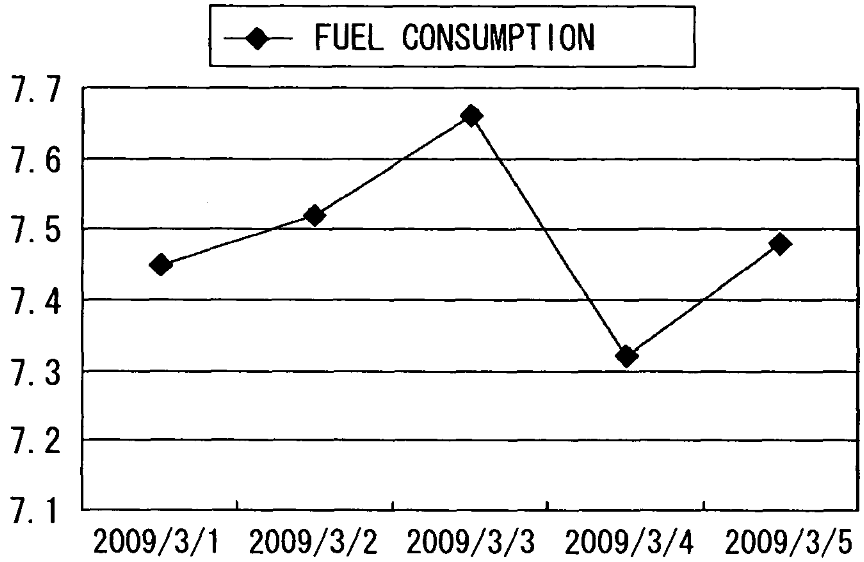
FIG. 5 is an example of indication of a driving operation diagnostic result according to the embodiment.

The operation diagnostic unit 151 performs a driving operation diagnosis to quantify a fuel consumption and a safety degree of a driving operation based on traveling history information stored in the storage unit 13. A safety degree of a driving operation is calculated from the number of a sudden braking operation, the number of a sudden steering operation, and the like. For example, when a value calculated by dividing the number of a sudden braking operation by a travel period is large in a day, a degree of safety in the day becomes low. In addition, when a value calculated by dividing the number of a sudden steering operation by a travel period is large in a day, the degree of safety in the day becomes low. A result of a driving operation diagnosis is transmitted to the cellular phone 2 via the communication device 11, and the transmitted result is indicated on the display unit 23 of the cellular phone 2. FIG. 5 shows an example of a calculated result of a fuel consumption from March 1 to March 5. The calculated result is indicated on a day-by-day basis. The indication of FIG. 5 is one example. Such a diagnosis of a driving operation can be performed and indicated on a basis of one unit of time greater than or equal to one day as a minimum unit. For example, a fuel consumption may be averaged day by day to calculate a fuel consumption on a weekly basis, a fuel consumption on a monthly basis, or a fuel consumption on yearly basis.

Figure 6:
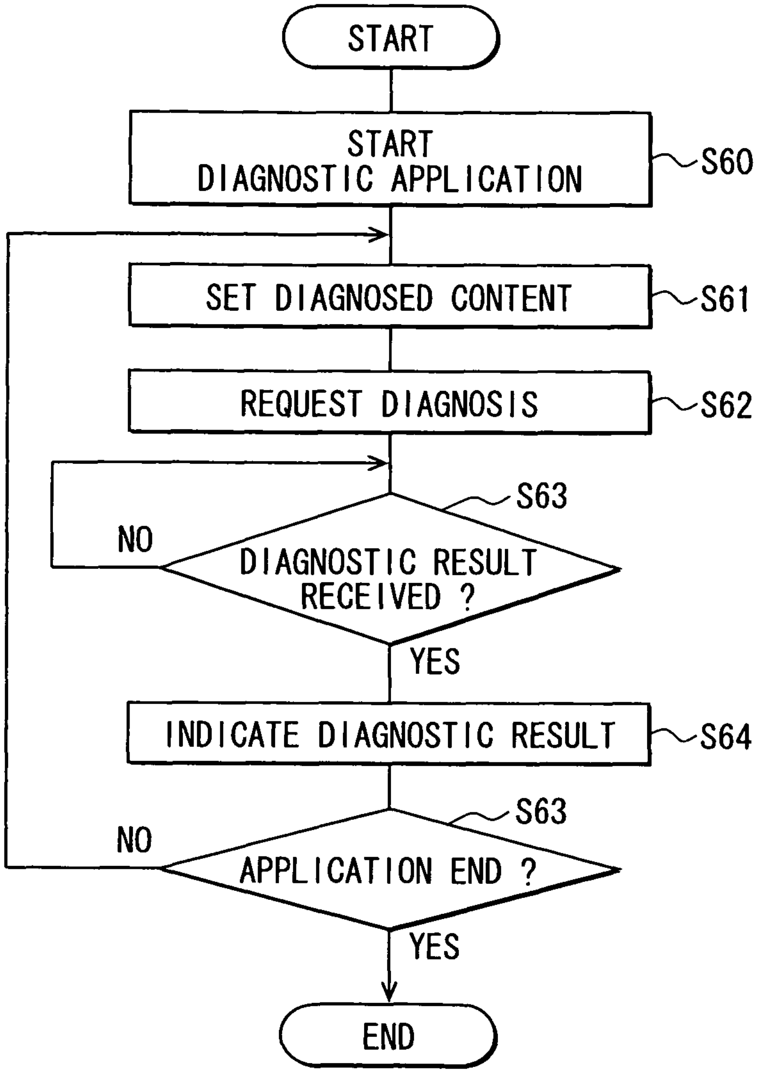
FIG. 6 is a flow chart showing an operation performed by a control unit of a cellular phone according to the embodiment.

Subsequently, an operation performed by the control unit 24 of the cellular phone 2 will be described with reference to a flow chart of FIG. 6. The processings in the flow chart are performed by executing a computer program stored in the control unit 24. For example, a user depresses a button switch of the operation switch group 22 to instruct the device to start a driving operation diagnostic application. In response to the instruction, at step S60 in FIG. 6, the driving operation diagnostic application is started.

At step S61, a user manipulates the operation switch group 22 to set a content of a driving operation to be diagnosed. Specifically, for example, a user selects a desired content of a driving operation to be diagnosed, such as indication of a daily fuel consumption as shown in FIG. 5, a weekly fuel consumption, and the like. At step S62, a driving operation, diagnosis request signal is transmitted to the driving operation diagnostic apparatus 1 via the communication device 21 to request a driving operation diagnosis of the content set at step S61.

At step S63, it is determined whether a driving operation diagnostic result is received. When a driving operation diagnostic result transmitted from the driving operation diagnostic apparatus 1 is received via the communication device 21, step S63 makes a positive determination. In this case, the processing proceeds to step S64. Step S63 repeats its processing until the driving operation diagnostic result is received.

At step S64, the received driving operation diagnostic result is indicated on the display unit 23. At step S65, it is determined whether the driving operation diagnostic application is to be terminated. When a user does not terminate the driving operation diagnostic application and desires to continue a diagnosis operation of another content, step S65 makes a negative determination. In this case, the processing returns to step S61. When the user desires to terminate the driving operation diagnostic application, step S65 makes a positive determination. In this case, the control unit 24 terminates the processing.

Subsequently, an operation performed by the control unit 15 of the driving operation diagnostic apparatus 1 will be described with reference to a flow chart of FIG. 7. The processings in the flow chart are performed by executing a computer program stored in the control unit 15.

A user activates an ignition switch to start a trip of the vehicle. In such a condition, at step S70 in FIG. 7, information for diagnosing a driving operation of a driver is obtained via the CAN transceiver 12 and the CAN 16. At step S71, information obtained at step S70 in a period from the start of the trip until the present time point of a driving operation is stored.

At step S72, it is determined whether a driving operation diagnosis is requested on the basis of determination whether a driving operation diagnosis request signal is received from the cellular phone 2. When a driving operation diagnosis request signal is received via the communication device 11, step S72 makes a positive determination. In this case, the processing proceeds to step S73. Alternatively, when a driving operation diagnosis request signal is not received, step S72 makes a-negative determination. In this case, the processing proceeds to step S75.

At step S73, a driving operation of a driver is diagnosed based on information on a diagnostic content included in the driving operation diagnosis request signal received at step S72. At step S74, a driving operation diagnostic result of a driver obtained at step S73 is transmitted to the cellular phone 2 through the communication device 11. Thus, the processing returns to step S72.

At step S75, it is determined whether the ignition switch is deactivated. When the ignition switch is deactivated to terminate the trip, step S75 makes a positive determination. In this case, the processing proceeds to step S76. Alternatively, when the ignition switch is not deactivated, step S75 makes a negative determination, and the processing returns to step S70.

At step S76, the information stored at step S71 is fixed to be the present trip data. As shown in FIG. 2, the trip data includes a date and time of a start of a trip, a date and time of an end of the trip, a travel distance, a fuel consumption obtained from the CAN 16, and the like.

At step S77, it is determined whether data of a day, which is the same as the day when the present trip is started, is stored. When data of a day, which is the same as the day when the present trip is started, is stored, step S77 makes a positive determination, and the processing proceeds to step S78. Alternatively when data of the same day is not stored, step S77 makes a negative determination, and the processing proceeds to step S79.

At step S78, as shown in FIG. 4, information on the present trip data (trip 3) is added to the already stored data on the same day, and the data of the day is updated. Thus, the updated data is stored. Finally, the control unit 15 terminates the present processing. On the other hand, at step S79, the present trip data is newly stored as data of the day when the present trip is started. Thus, the control unit 15 terminates the operation.

As described above, according to the present embodiment, data of a trip, which continues for two days beyond midnight, is stored as data of a trip of a day when the trip is started, i.e., data of a trip of the first date. That is, data (traveling history information) of a trip is assigned altogether on the day when the trip is started. Therefore, a continuous period of one trip from activation of the ignition switch to deactivation of the ignition switch is determined to be a time unit. Thus, data of such a trip in the continuous period is not divided and is not used for a driving operation diagnosis. In addition, the same data is not redundantly used twice or more. Therefore, a reliable driving operation diagnosis of a driver can be performed. Further, the time period, in which the engine of the vehicle is actually in operation from activation of the ignition switch until deactivation of the ignition switch, is set to an object of a driving operation diagnosis. Thereby, a content of a driving operation of the vehicle can be thoroughly diagnosed.

In the present embodiment, the apparatus is applied to a vehicle having an internal combustion engine as a driving source. The application of the apparatus is not limited to a vehicle having an internal combustion engine. For example, the apparatus may be applied to an electric vehicle having an electric motor as a driving source. Alternatively, the apparatus may be applied to a hybrid vehicle having an internal combustion engine and an electric motor as a driving source. In these cases, the operation diagnostic unit 151 of the driving operation diagnostic apparatus 1 may perform a driving operation diagnosis to quantify an electricity consumption based on traveling history information stored in the storage unit 13. The present electricity consumption is a consumption efficiency of an electricity consumed by an electric motor.

In the present embodiment, one trip is from activation of an ignition switch of a vehicle to deactivation of the ignition switch. The definition of one trip is not limited to that of the above embodiment. For example, one trip may be defined to one segment of a driving operation from a specific start of a driving operation to a specific end of the driving, operation differently from the definition of one trip from activation of an ignition switch of a vehicle to deactivation of the ignition switch. For example, one trip may be defined as a segment from when a vehicle leaves a start point, which is set by a navigation device, until when the vehicle arrives at a destination, which is set by the navigation device.

The present navigation device may be a generally-known navigation device configured to specify the current position of a vehicle on a map using data obtained by various sensors and map data stored in a storage medium. The various sensors may include the above-described acceleration sensor, the above-described angular velocity sensor, the above-described travel distance sensor, and a global positioning system (GPS) receiver. The GPS receiver is configured to detect the current position of a vehicle based on an electric wave transmitted from a space satellite. The navigation device includes an operation input section for setting a start point and a destination. A user can set a start point and a destination by manipulating the operation input section. The current position of a vehicle may be set as a start point.

In this case, the driving operation diagnostic apparatus 1 may obtain a signal, which shows a vehicle start, and a signal, which shows a destination arrival, from the navigation device communicated with the driving operation diagnostic apparatus 1 via the CAN. Further, the operation diagnostic unit 151 may perform determination of the vehicle start and the destination arrival based on the obtained signal. The vehicle start is that a vehicle leaves a start point, which is set by the navigation device. The destination arrival is that the vehicle arrives at a destination, which is set by the navigation device. The navigation device may detect a vehicle start and a destination arrival based on the current position of the vehicle specified by the navigation device and map data. In the present configuration, one trip is defined as a segment from leaving a start point to arriving at the destination. Therefore, a driving operation of the vehicle after leaving a start point until arriving at a destination can be diagnosed irrespective of a condition after arriving at the destination.

For example, a navigation device may transmit a signal, which shows a vehicle start, and a signal, which shows a destination arrival, to the cellular phone 2 via a Bluetooth communication. Further, the cellular phone 2 may transmit the signal, which shows the vehicle start, and the signal, which shows the destination arrival, to the driving operation diagnostic apparatus 1. Thereby, the driving operation diagnostic apparatus 1 can obtain the signal, which shows the vehicle start, and the signal, which shows destination arrival.

In the present example, one trip is defined as a segment from leaving a start point to arriving at a destination. For example, one trip may be defined as a segment from a start of a driving operation of a vehicle to arrival of the vehicle at a destination, which is set by the navigation device. In this case, the operation diagnostic unit 151 may determine that a driving operation of a vehicle is started in response to activation of an ignition switch of a vehicle.

In another example, one trip may be defined as a segment from energy supply for traveling a vehicle to subsequent energy supply for traveling the vehicle. When a vehicle is driven by an internal combustion engine as a traveling driving source, the energy for traveling the vehicle is fuel such as gasoline consumed in the internal combustion engine. When a vehicle is driven by an electric motor as a traveling driving source, the energy for traveling the vehicle is electric power charged in a battery for traveling, which is for supplying electricity to the electric motor. When a vehicle is a hybrid vehicle driven by both an internal combustion engine and an electric motor as a traveling driving source, the energy for traveling the vehicle is both fuel and electric power.

For example, the driving operation diagnostic apparatus 1 may determine that a vehicle is supplied with fuel when a remaining fuel sensor provided in the vehicle detects increase in remaining fuel by a quantity more than a range of a measurement error. Alternatively, in an electric vehicle or a hybrid vehicle, a charge monitor unit may be provided for monitoring a state of charge (SOC) of a traveling battery. In this case, the driving operation diagnostic apparatus 1 may determine that a battery for traveling is charged with electricity based on an SOC monitored by such a charge monitor unit. Specifically, the driving operation diagnostic apparatus 1 may determine a battery charge when such a charge monitor unit detects increase in remaining electricity of the battery by a quantity more than a charge generally performed in a traveling of the vehicle Further, a user may select one trip for diagnosing a driving operation from the above-described segments. Specifically, a first trip may be defined as a segment from a departure of the vehicle from a start point, which is set by a navigation device, to an arrival of the vehicle at a destination, which is set by the navigation device. In addition, a second trip may be defined as a segment from activation of an ignition switch of a vehicle to deactivation of the ignition switch. Further, a third trip may be defined as a segment from energy supply for traveling a vehicle to subsequent energy supply for traveling the vehicle.

In this case, a user may manipulate the operation switch group 22 to select one of the first to third trips. In this case, the communication device 11 may receive input of a user to select one of the first to third trips via the operation switch group 22. Further, the storage unit 13 may store data (traveling history information) corresponding to the selected trip received by the communication device 11. In this case, the communication device 11 may be equivalent to a selected trip receiving unit.

Further, in this case, the storage unit 13 may store data items corresponding to multiple trips so as to diagnose driving operations in multiple kinds of trips.

In the present configuration, a user can select one trip from various segments for diagnosing a driving operation. Therefore, the driving operation diagnostic apparatus 1 can accept various requests from a user for selecting one trip from various segments. Thus, operability of the driving operation diagnostic apparatus 1 can be enhanced.

In the present example, the communication device 11 receives an input from a user to select one trip from the first trip, the second trip, and the third trip by manipulating the operation switch group 22 of the cellular phone 2. The input of a trip is not limited to that of the present example. For example, the driving operation diagnostic apparatus 1 may include an operation input section (not shown) to receive an input from a user to select one trip from the first trip, the second trip, and the third trip.

Further, the time unit (diagnostic period) for performing a diagnose operation may be selected from multiple kinds of units such as one day, one week, one month, and one year, as described above.

In this case, a user may manipulate the operation switch group 22 to select desired time unit from one day, one week, one month, and one year. Further, the communication device 11 may receive a signal specifying one of one day, one week, one month, and one year selected by a user via the operation switch group 22. Thus, the operation diagnostic unit 151 may set the selected one of one day, one week, one month, and one year in accordance with the signal received by the communication device 11. In this case, the communication device 11 may be equivalent to a selected time unit receiving unit and a setting unit.

In the present configuration, a user can set a predetermined period to a desired time unit. Thus, a user can make an effort to improve a driving operation based on a diagnostic result of a driving operation obtained for each time unit desired by the user. Specifically, a user can select the time unit to make an object to achieve a result today better than a result of yesterday, or to achieve a result this month better than a result of last month.

In the present example, the communication device 11 receives an input from a user to select one of one day, one week, one month, and one year by manipulating the operation switch group 22. The input of a time unit is not limited to that of the present example. For example, the driving operation diagnostic apparatus 1 may include an operation input section (not shown) to receive an input from a user to select one time unit from one day, one week, one month, and one year.

Figure 9:
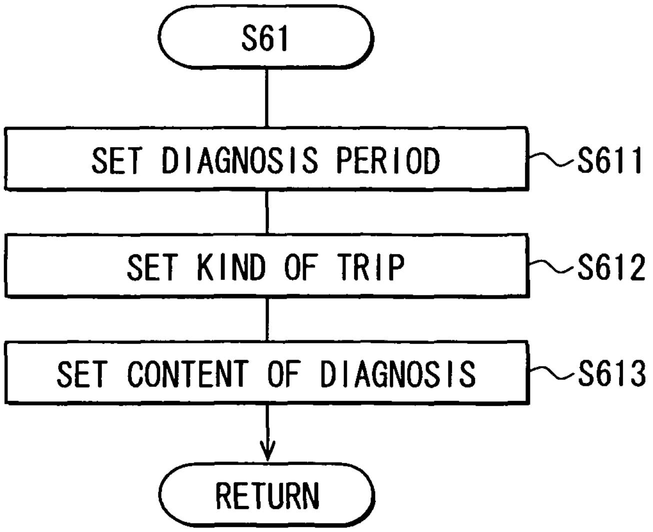
FIG. 9 is a flow chart showing one example of an operation for setting a content of a driving operation diagnosis.

As follows, a different example of an operation for setting of a content of a driving operation to be diagnosed will be described. In the present different example, as described above, a user can select one trip for diagnosing a driving operation from multiple kinds trips, and a user can select one time unit for diagnosing a driving operation from multiple kinds of time units: FIG. 9 is a flow chart showing one example of an operation to set a content of a driving operation diagnosis.

At step S611, a diagnostic period is set. Subsequently, the processing proceeds to step S612. In the setting of a diagnostic period, a user manipulates the operation switch group 22 to select one time unit from one day, one week, one month, and one year. Thus, the selected time unit is set to a diagnostic period.

At step S612, a kind of one trip is set. Subsequently, the processing proceeds to step S613. In the setting of a kind of one trip, a user manipulates the operation switch group 22 to select one trip from the first trip, the second trip, and the third trip. Thus, the selected one trip is set.

At step S613, a content of a driving operation diagnosis is set. Subsequently, the processing proceeds to step S62. In the setting of a content of a driving operation diagnosis, a user manipulates the operation switch group 22 to select a desired content of a driving operation diagnosis such as indication of a daily fuel consumption shown in FIG. 5, indication of a weekly fuel consumption, or the like. Thus, the selected content is set.

Further, in this case, at step S62, a driving operation diagnosis request signal is transmitted to the driving operation diagnostic apparatus 1 via the communication device 21 to request a driving operation diagnosis of the content set at step S613. In addition, information on the diagnostic period set at step S611 and information on the kind of one trip set at step S612 are transmitted to the driving operation diagnostic apparatus 1 via the communication device 21.

A desired time unit of a diagnostic period may change according to a kind of one trip. Therefore, a kind of one trip selected at step S612 may be determined according to the diagnostic period set at step S611. For example, the first trip and the second trip suit to all the time units between one day and one year. Therefore, at step S612, the first trip and the second trip may be set to be selectable even when any time unit between one day and one year is set to a diagnostic period at step S611.

On the other hand, for example, the third trip may not be suitable when a time unit (diagnostic period) is set to one day in a case where supply of fuel. Therefore, when one day is set to a time unit at step S611, the third trip may be excluded from selectable items at step S612. Contrary, in a case of electricity charge of a battery for traveling, for example, the third trip may be suitable to all the time units between one day and one year. Therefore, when any one of time units between one day and one year is set to a diagnostic period at step S611, the third trip may be included in selectable items at step S612.

In the present example, a kind of one trip is set after the diagnosis period is set. The operation is not limited to that of the present example. For example, a diagnostic period may be set after setting of a kind of one trip. In this case, only a specific diagnostic period may be set to be selectable according to the kind of one trip, which is previously set. Thus, a diagnostic period may be selected from the selectable diagnostic periods.

For example, the first trip and the second trip suit to all the time units between one day and one year. Therefore, any one of time units between one day and one year may be set to be selectable when the first trip or the second trip is selected as a kind of one trip.

On the other hand, for example, the third trip may not be suitable when a time unit (diagnostic period) is set to one day in a case where supply of fuel. Therefore, when the third trip is selected as a kind of one trip in advance, one day may be excluded from selectable items of a diagnostic period. Contrary, in a case of electricity charge of a battery for traveling, for example, the third trip may be suitable to all the time units between one day and one year. Therefore, when the third trip is selected as a kind of one trip in advance, any one of time units between one day and one year may be included in selectable items.

First Modification

Subsequently, a first modification will be described. In the present modification, instead of the processings of steps S77 to S79 in FIG. 7, when a start day, in which a trip starts, differs from an end day, in which the trip ends, and when a travel period of the trip in the start day is longer than a travel period of the trip in the end day, the trip data is stored as data of the start day. Alternatively, when a travel period of the trip in the start day is shorter than a travel period of the trip in the end day, the trip data, is stored as data of the end day. Specifically, for example, as shown in FIG. 8, the trip 4 continues in March 3 and March 4, and the travel period of the trip includes midnight between March 3 and March 4. In this case, according to the above embodiment, the trip data of the trip 4 is stored as data on March 3, since the trip 4 starts from March 3. Contrary, according to the present modification, the trip data of the trip 4 is stored as data on March 4, since a travel period of the trip 4 on March 4 is longer than a travel period of the trip 4 on March 3. In this manner, the driving operation diagnosis can be performed further in conformity to an actual condition.

Second Modification

Figure 7:
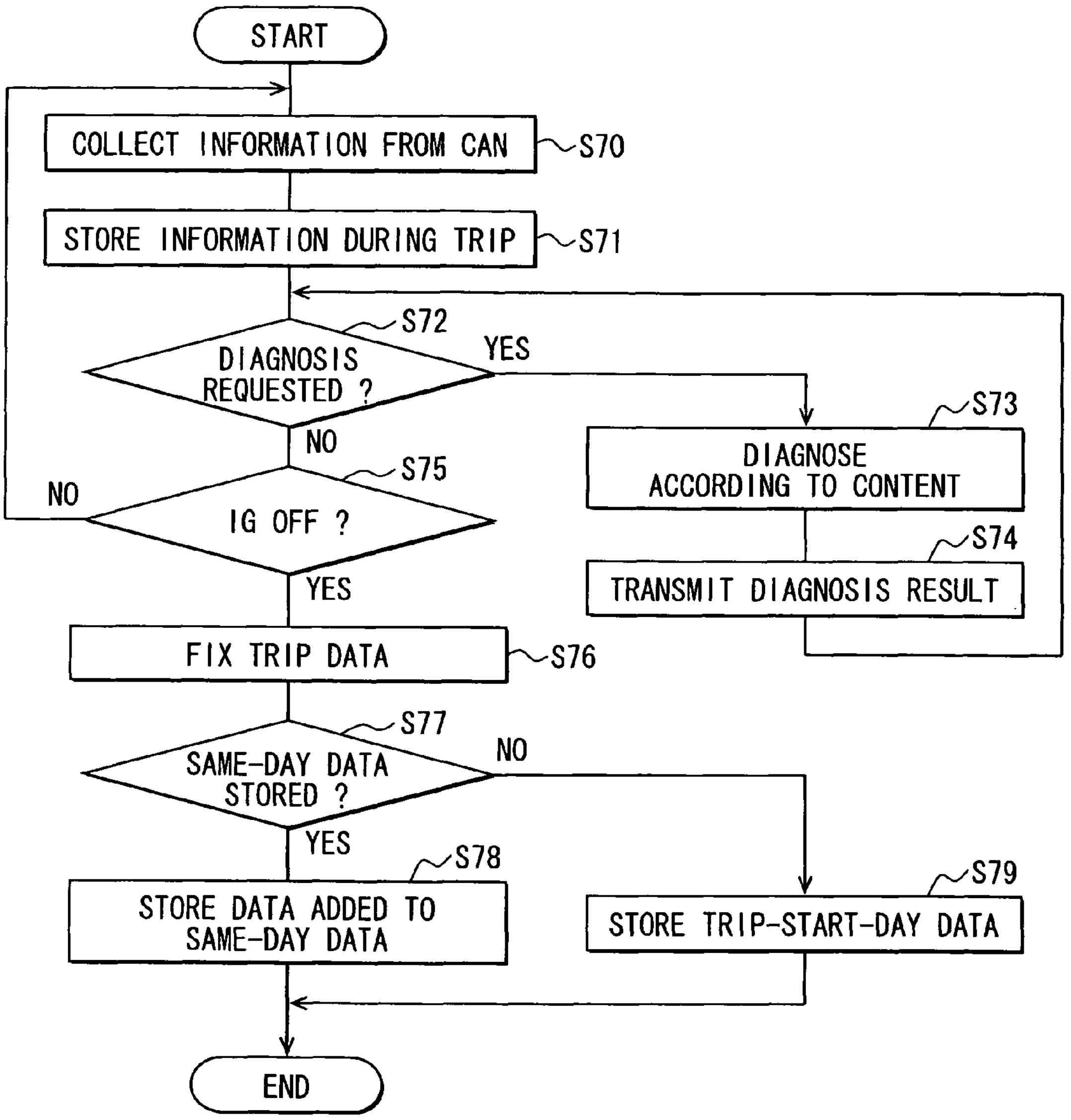
FIG. 7 is a flow chart showing an operation performed by a control unit of the driving operation diagnostic apparatus according to the embodiment.
Figure 8:
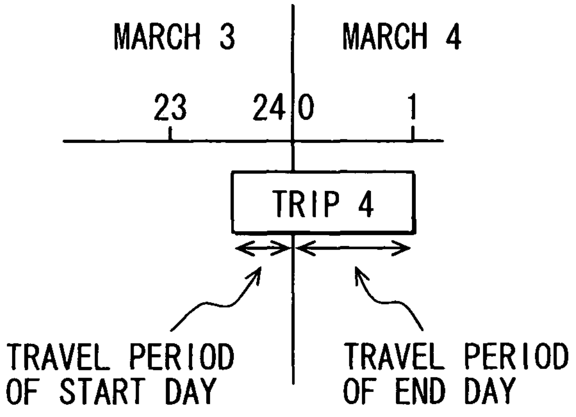
FIG. 8 is an explanatory view showing an operation according to a first modification of the embodiment.

In the present second modification, instead of the processings of steps S77 to S79 in FIG. 7, when a start day, in which a trip starts, differs from an end day, in which the trip ends, and when a travel distance of the trip in the start day is longer than a travel distance of the trip in the end day, the trip data is stored as data of the start day. Alternatively, when a travel distance of the trip in the start day is shorter than a travel distance of the trip in the end day, the trip data is stored as data of the end day. In this manner, the driving operation diagnosis can be performed further in conformity to an actual condition.

Third Modification

Subsequently, a third modification will be described. In the above-described embodiment, when a driving operation is started and terminated, trip data obtained in the trip of the driving operation is stored as data of a start day in which the driving operation is started. Contrary, in the present modification, data is not stored oh a daily basis, but trip data of each trip is individually stored. Trip data is combined with a date and time of start of the trip and a date and time of end of the trip, and the combined data is stored. The driving operation diagnosis is performed based on trip data, which corresponds to a trip of a driving operation started within a predetermined period specified by a user, among stored trip data. In this way, the predetermined period is not beforehand set in the self device. A user can arbitrarily set the predetermined period.

Summarizing the above embodiment, the driving operation diagnostic apparatus includes:

- a storing unit configured to store traveling history information on a vehicle of a trip, the trip being a segment from a start of a driving operation to an end of the driving operation;
- a determination unit configured to determine whether to assign traveling history information of one trip among the traveling history information stored in the storing unit to be traveling history information in a predetermined period, the one trip being partially included in the predetermined period; and
- a driving operation diagnostic unit configured to diagnose a driving operation of a driver in the predetermined period according to the traveling history information determined by the determination unit to be assigned as the traveling history information in the predetermined period.

According to the present configuration, traveling history information of a trip, which is a continuous travel period from a start of a driving operation to an end of the driving operation, is not divided into, for example, two segments to be used for a driving operation diagnosis of a driver. In this manner, traveling history information of a trip can be appropriately reflected to a driving operation diagnosis in a predetermined period.

The determination unit is configured to determine to assign traveling history information of a trip as the traveling history information in the predetermined period, the trip being in the predetermined period is longer than the trip being outside the predetermined period. The determination unit is configured to determine to assign traveling history information of a trip as the traveling history information in the predetermined period, a distance of the trip in the predetermined period is longer than a distance of the trip outside the predetermined period. In the present configuration, traveling history information of a trip, in which a feature of a driving operation appears with a high possibility, can be reflected, and a driving operation diagnosis can be performed with a high reliability.

The determination unit is configured to determine to assign traveling history information of a trip as the traveling history information in the predetermined period, the trip being started in the predetermined period. Thereby, an operation can be accelerated.

The predetermined period is one of one day, one week, one month, and one year. A selected unit time receiving unit is configured to receive the one of one day, one week, one month, and one year, which is selected by a user as the predetermined period. The driving operation diagnostic apparatus (setting unit) is configured to set the predetermined period to the one of one day, one week, one month, and one year, according to the input received by the selected time unit receiving unit. In this manner, the predetermined period is set to a general time unit such as one day, one week, one month, and one year in a human life.

Thereby, a diagnosis operation can be performed in conformity with a human life. In addition, by setting the predetermined period to a general time unit in a human life, a user can make an effort to improve a driving operation based on a diagnostic result of a driving operation obtained for each time unit general in a human life. Specifically, a user makes an object to achieve a result today better than a result of yesterday, or to achieve a result this month better than a result of last month. In addition, by using a general time unit in a human life as a unit of a predetermined period, a driver's diagnostic result can be easily compared with another person's diagnostic result.

The vehicle includes a navigation device. The storing unit stores traveling history information of a trip, the trip being a segment from a start of a driving operation of the vehicle to a point, in which the vehicle arrives at a destination, the destination being set by the navigation device.

For example, when a driver looks for a parking lot after arriving at a destination, or when a parking takes time, a driving operation may be diagnosed to be inferior. Consequently, a diagnostic result may become inferior. For example, since a driver looks for a parking lot after arriving at a destination, or since a parking takes time, low-speed traveling increases, and braking is frequently conducted. Therefore, an efficiency of furl consumption and an efficiency of energy consumption becomes low. Consequently, a diagnostic result becomes inferior. In such a case, a diagnostic result changes due to a condition after the vehicle arrives at a destination. Therefore, even when the vehicle travels in the same path for multiple times, driving operations cannot be compared with each other with high accuracy. For example, it is supposed that a present driving operation before arriving at a destination is diagnosed to be better than a previous driving operation on the same path before arriving at the destination. Even in such a case, when a driver looks for a parking lot after arriving at the destination in the present driving operation, a diagnostic result becomes inferior compared with that of the previous driving operation. Accordingly, an object of the diagnosis cannot be satisfied.

Contrary, in the present configuration, one trip is defined as a segment from leaving a start point until arriving at the destination. Therefore, a driving operation of the vehicle after leaving a start point until arriving at a destination can be diagnosed irrespective of a condition after arriving at the destination.

The storing unit stores traveling history information of a trip, the trip being a segment from a point, in which an ignition switch of the vehicle is activated, to a point, in which the ignition switch is deactivated. In this manner, a segment, in which a driving source such as an engine and an electric motor of a vehicle is actually in operation, is an object to be diagnosed. Thereby, a content of a driving operation can be thoroughly diagnosed.

The storing unit stores traveling history information of a trip, the trip being a segment from a point, in which the vehicle is supplied with energy for traveling, to a point in which the vehicle is subsequently supplied with energy for traveling. Supply of energy for traveling, such as fuel supply and a battery charge, is one of events to stop a vehicle. A driver of the vehicle may change when energy is supplied. Therefore, a segment from an energy supply to a subsequently energy supply may be considered as one segment from a start of a driving operation to an end of the driving operation.

The vehicle includes a navigation device. The driving operation diagnostic apparatus further includes a selected trip receiving unit configured to receive an input of one of a first trip, a second trip, and a third trip, which is selected by a user. The first trip is a segment from a departure of the vehicle from a start point to an arrival of the vehicle at a destination, the start point set and the destination being set by the navigation device. The second trip is a segment from a point, in which the ignition switch of the vehicle is activated, to a point, in which the ignition switch of the vehicle is deactivated. The third trip is a segment from a point, in which the vehicle is supplied with energy for traveling, to a point, in which the vehicle is subsequently supplied with energy for traveling. The driving operation diagnostic unit is further configured to diagnose a driving operation of a driver in a predetermined period according to traveling history information in the inputted one of the first trip, the second trip, and the third trip, which is received by the selected trip receiving unit.

In the present configuration, a user can select one trip from various segments for diagnosing a driving operation. Therefore, the driving operation diagnostic apparatus can accept various requests from a user for selecting one trip from various segments. Thus, operability of the driving operation diagnostic apparatus can be enhanced. Such enhance in operability promotes use of a diagnostic operation. Thus, a large number of users may improve a driving operation based on a diagnostic result. Consequently, an automotive society may be established.

The driving operation diagnostic unit is further configured to diagnose an efficiency of an energy consumption of a vehicle in a predetermined period, as the driving operation of the driver in the predetermined period. A efficiency of energy consumption is a characteristic index of economic and ecological driving operation. Thus, in the present configuration, a diagnostic result can be used for improvement of an environment and cost reduction.

The driving operation diagnostic unit is further configured to diagnose a safety of a driving operation of a driver in a predetermined period, as the driving operation of the driver in the predetermined period. In the present configuration, a diagnostic result can be used for a safety driving operation. In addition, the number of users who perform a safety driving may increase. Consequently, such an automotive society may be supported by a person who does not own an automobile.

The above structures of the embodiments can be combined as appropriate.

The above processings such as calculations and determinations are not limited being executed by the control units 24, 15. The control unit may have various structures including the control units 24, 15 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A driving operation diagnostic apparatus comprising:
- a storage unit configured to store traveling history information items on a vehicle, the traveling history information items being respectively associated with trips each being a segment from a start of a driving operation to an end of the driving operation; and
- a processor, the processor being configured to
  - determine, in a determination unit, whether to assign one of the traveling history information items, which is stored in the storage unit and associated with one trip, to a predetermined time period, the one trip being partially included in the predetermined time period;
  - determine, in the determination unit, whether a travel period of the one trip included in the predetermined time period is longer than a travel period of the one trip excluded from the predetermined time period;
  - diagnose, in a driving operation diagnostic unit, a driving operation of a driver in the predetermined time period according to the traveling history information item determined by the determination unit to be assigned to the predetermined time period, wherein the one trip is determined to be assigned to the predetermined time period when the travel period of the one trip included in the predetermined time period is determined to be longer than the travel period of the one trip excluded from the predetermined time period; and determine the one trip to not be assigned to the predetermined time period, when the travel period of the one trip included in the predetermined time period is determined to not be longer than the travel period of the one trip excluded from the predetermined time period.

2. The driving operation diagnostic apparatus according to claim 1, wherein the predetermined time period is one of one day, one week, one month, and one year, the driving operation diagnostic apparatus is further configured to:

receive, in a selected time unit receiving unit, an input of the one of one day, one week, one month, and one year, which is selected by a user as the predetermined time period; and set, in a setting unit, the predetermined time period to the one of one day, one week, one month, and one year, according to the input received by the selected time unit receiving unit.

3. The driving operation diagnostic apparatus according to claim 1, wherein the vehicle includes a navigation device, and wherein the one trip being a segment from a start of a driving operation of the vehicle to a point in which the vehicle arrives at a destination, which is set by the navigation device.

4. The driving operation diagnostic apparatus according to claim 1, wherein the one trip is a segment from a first point, in which an ignition switch of the vehicle is activated, to a second point, in which the ignition switch is deactivated.

5. The driving operation diagnostic apparatus according to claim 1, wherein the one trip is a segment from a first point, in which the vehicle is supplied with energy, to a second point, in which the vehicle is supplied with energy subsequent to the first point.

6. The driving operation diagnostic apparatus according to claim 1, wherein the vehicle includes a navigation device, the driving operation diagnostic apparatus is further configured to:

receive, in a selected trip receiving unit, an input of one of a first trip, a second trip, and a third trip, which is selected by a user, wherein the first trip is a segment from a point, in which the vehicle departs from a start point, to a point, in which the vehicle arrives at a destination, the start point and the destination being set by the navigation device, wherein the second trip is a segment from a point, in which an ignition switch of the vehicle is activated, to a point, in which the ignition switch is deactivated, wherein the third trip is a segment from a point, in which the vehicle is supplied with energy, to a point, in which the vehicle is subsequently supplied with energy, wherein the driving operation diagnostic unit is further configured to diagnose a driving operation of a driver in the predetermined time period according to the traveling history information item in the one of the first trip, the second trip, and the third trip, an input of the one of the first trip, the second trip, and the third trip being received by the selected trip receiving unit.

7. The driving operation diagnostic apparatus according to claim 1, wherein the driving operation diagnostic unit is further configured to diagnose an efficiency of an energy consumption of the vehicle in the predetermined time period, as the driving operation of the driver in the predetermined time period.

8. The driving operation diagnostic apparatus according to claim 1, wherein the driving operation diagnostic unit is further configured to diagnose a safety of a driving operation of a driver in the predetermined time period, as the driving operation of the driver in the predetermined time period.

9. The driving operation diagnostic apparatus according to claim 1, wherein the processor is further configured to separate the one trip into a start period in which the one trip starts and an end period in which the one trip ends by a transition from one day to a next day;

determine whether the start period is shorter than the end period; and assign all data of the one trip as data of the end period which corresponds to the predetermined time period, when the processor determines that the start period is shorter than the end period.

10. A method for diagnosing a driving operation, the method comprising:

storing, by a processor, traveling history information items on a vehicle, the traveling history information items being respectively associated with trips each being a segment from a start of a driving operation to an end of the driving operation;

determining, by the processor, whether to assign one of the stored traveling history information items, which is associated with one trip, to a predetermined time period, the one trip being partially included in the predetermined time period;

determining, by the processor, whether a travel period of the one trip included in the predetermined time period is longer than a travel period of the one trip excluded from the predetermined time period;

diagnosing, by the processor, a driving operation of a driver in the predetermined time period according to the traveling history information item determined to be assigned to the predetermined time period, wherein the one trip is determined to be assigned to the predetermined time period when the travel period of the one trip included in the predetermined time period is determined to be longer than the travel period of the one trip excluded from the predetermined time period; and determining, by the processor, the one trip to not be assigned to the predetermined time period, when the travel period of the one trip included in the predetermined time period is determined to not be longer than the travel period of the one trip excluded from the predetermined time period.

11. The method according to claim 10, further comprising separating, by the processor, the one trip into a start period in which the one trip starts and an end period in which the one trip ends by a transition from one day to a next day;

determining, by the processor, whether the start period is shorter than the end period; and assigning, by the processor, all data of the one trip as data of the end period which corresponds to the predetermined time period, when the processor determines that the start period is shorter than the end period.

12. A non-transitory computer readable medium comprising instructions executed by a computer, the instructions including:

storing traveling history information items on a vehicle, the traveling history information items being respectively associated with trips each being a segment from a start of a driving operation to an end of the driving operation;

determining whether to assign one of the stored traveling history information items, which is associated with one trip, to a predetermined time period, the one trip being partially included in the predetermined time period;

determining whether a travel period of the one trip included in the predetermined time period is longer than a travel period of the one trip excluded from the predetermined time period;

diagnosing a driving operation of a driver in the predetermined time period according to the traveling history information item determined to be assigned to the predetermined time period, wherein the one trip is determined to be assigned to the predetermined time period when the travel period of the one trip included in the predetermined time period is determined to be longer than the travel period of the one trip excluded from the predetermined time period; and determining the one trip to not be assigned to the predetermined time period, when the travel period of the one rip included in the predetermined time period is determined to not be longer than the travel period of the one trip excluded from the predetermined time period.

13. The non-transitory computer readable medium according to claim 12, the instructions further including separating, by the processor, the one trip into a start period in which the one trip starts and an end period in which the one trip ends by a transition from one day to a next day;

determining, by the processor, whether the start period is shorter than the end period; and assigning, by the processor, all data of the one trip as data of the end period which corresponds to the predetermined time period, when the processor determines that the start period is shorter than the end period.

14. A driving operation diagnostic apparatus comprising:

a storage unit configured to store traveling history information items on a vehicle, the traveling history information items being respectively associated with trips each being a segment from a start of a driving operation to an end of the driving operation; and a processor, the processor being configured to determine, in a determination unit, whether to assign one of the traveling history information items, which is stored in the storage unit and associated with one trip, to a predetermined time period, the one trip being partially included in the predetermined time period;

determine, in the determination unit, whether a distance of the one trip included in the predetermined time period is longer than a distance of the one trip excluded from the predetermined time period;

diagnose, in a driving operation diagnostic unit, a driving operation of a driver in the predetermined time period according to the traveling history information item determined by the determination unit to be assigned to the predetermined time period, wherein the one trip is determined to be assigned to the predetermined time period when the distance of the one trip included in the predetermined time period is determined to be longer than the distance of the one trip excluded from the predetermined time period; and determine the one trip to not be assigned to the predetermined time period, when the distance of the one trip included in the predetermined time period is determined to not be longer than the distance of the one trip excluded from the predetermined time period.

15. The driving operation diagnostic apparatus according to claim 14, wherein the predetermined time period is one of one day, one week, one month, and one year, the driving operation diagnostic apparatus is further configured to:

receive, in a selected time unit receiving unit, an input of the one of one day, one week, one month, and one year, which is selected by a user as the predetermined time period; and set, in a setting unit, the predetermined time period to the one of one day, one week, one month, and one year, according to the input received by the selected time unit receiving unit.

16. The driving operation diagnostic apparatus according to claim 14, wherein the vehicle includes a navigation device, and wherein the one trip being a segment from a start of a driving operation of the vehicle to a point in which the vehicle arrives at a destination, which is set by the navigation device.

17. The driving operation diagnostic apparatus according to claim 14, wherein the one trip is a segment from a first point, in which an ignition switch of the vehicle is activated, to a second point, in which the ignition switch is deactivated.

18. The driving operation diagnostic apparatus according to claim 14, wherein the one trip is a segment from a first point, in which the vehicle is supplied with energy, to a second point, in which the vehicle is supplied with energy subsequent to the first point.

19. The driving operation diagnostic apparatus according to claim 14, wherein the vehicle includes a navigation device, the driving operation diagnostic apparatus is further configured to:

receive, in a selected trip receiving unit, an input of one of a first trip, a second trip, and a third trip, which is selected by a user, wherein the first trip is a segment from a point, in which the vehicle departs from a start point, to a point, in which the vehicle arrives at a destination, the start point and the destination being set by the navigation device, wherein the second trip is a segment from a point, in which an ignition switch of the vehicle is activated, to a point, in which the ignition switch is deactivated, wherein the third trip is a segment from a point, in which the vehicle is supplied with energy, to a point, in which the vehicle is subsequently supplied with energy, wherein the driving operation diagnostic unit is further configured to diagnose a driving operation of a driver in the predetermined time period according to the traveling history information item in the one of the first trip, the second trip, and the third trip, an input of the one of the first trip, the second trip, and the third trip being received by the selected trip receiving unit.

20. The driving operation diagnostic apparatus according to claim 14, wherein the driving operation diagnostic unit is further configured to diagnose an efficiency of an energy consumption of the vehicle in the predetermined time period, as the driving operation of the driver in the predetermined time period.

21. The driving operation diagnostic apparatus according to claim 14, wherein the driving operation diagnostic unit is further configured to diagnose a safety of a driving operation of a driver in the predetermined time period, as the driving operation of the driver in the predetermined time period.

22. The driving operation diagnostic apparatus according to claim 14, wherein the processor is further configured to separate the one trip into a start period in which the one trip starts and an end period in which the one trip ends by a transition from one day to a next day;

determine whether a distance in the start period is shorter than a distance in the end period; and assign all data of the one trip as data of the end period which corresponds to the predetermined time period, when the processor determines that distance in the start period is shorter than the distance in the end period.

23. A method for diagnosing a driving operation, the method comprising:

storing, by a processor, traveling history information items on a vehicle, the traveling history information items being respectively associated with trips each being a segment from a start of a driving operation to an end of the driving operation;

determining, by the processor, whether to assign one of the stored traveling history information items, which is associated with one trip, to a predetermined time period, the one trip being partially included in the predetermined time period;

determining, by the processor, whether a distance of the one trip included in the predetermined time period is longer than a distance of the one trip excluded from the predetermined time period;

diagnosing, by the processor, a driving operation of a driver in the predetermined time period according to the traveling history information item determined to be assigned to the predetermined time period, wherein the one trip is determined to be assigned to the predetermined time period when the distance of the one trip included in the predetermined time period is determined to be longer than the distance of the one trip excluded from the predetermined time period; and determining, by the processor, the one trip to not be assigned to the predetermined time period, when the distance of the one trip included in the predetermined time period is determined to not be longer than the distance of the one trip excluded from the predetermined time period.

24. The method according to claim 23, further comprising separating, by the processor, the one trip into a start period in which the one trip starts and an end period in which the one trip ends by a transition from one day to a next day;

determining, by the processor, whether a distance in the start period is shorter than a distance in the end period; and assigning, by the processor, all data of the one trip as data of the end period which corresponds to the predetermined time period, when the processor determines that the distance in the start period is shorter than the distance in the end period.

25. A non-transitory computer readable medium comprising instructions executed by a computer, the instructions including:

storing traveling history information items on a vehicle, the traveling history information items being respectively associated with trips each being a segment from a start of a driving operation to an end of the driving operation;

determining whether to assign one of the stored traveling history information items, which is associated with one trip, to a predetermined time period, the one trip being partially included in the predetermined time period;

determining whether a distance of the one trip included in the predetermined time period is longer than a distance of the one trip excluded from the predetermined time period;

diagnosing a driving operation of a driver in the predetermined time period according to the traveling history information item determined to be assigned to the predetermined time period, wherein the one trip is determined to be assigned to the predetermined time period when the distance of the one trip included in the predetermined time period is determined to be longer than the distance of the one trip excluded from the predetermined time period; and determining the one trip to not be assigned to the predetermined time period, when the distance of the one trip included in the predetermined time period is determined to not be longer than the distance of the one trip excluded from the predetermined time period.

26. The non-transitory computer readable medium according to claim 25, the instructions further including separating, by the processor, the one trip into a start period in which the one trip starts and an end period in which the one trip ends by a transition from one day to a next day;

determining, by the processor, whether a distance in the start period is shorter than a distance in the end period; and assigning, by the processor, all data of the one trip as data of the end period which corresponds to the predetermined time period, when the processor determines that the distance in the start period is shorter than the distance in the end period.

* * * * *